US010193153B2

(12) United States Patent
Jito et al.

(10) Patent No.: US 10,193,153 B2
(45) Date of Patent: Jan. 29, 2019

(54) POSITIVE ELECTRODE ACTIVE MATERIAL FOR NONAQUEOUS ELECTROLYTE SECONDARY BATTERY

(71) Applicant: SANYO Electric Co., Ltd., Daito-shi, Osaka (JP)

(72) Inventors: Daizo Jito, Osaka (JP); Takeshi Ogasawara, Hyogo (JP); Akihiro Kawakita, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/317,180

(22) PCT Filed: Jul. 14, 2015

(86) PCT No.: PCT/JP2015/003550
§ 371 (c)(1),
(2) Date: Dec. 8, 2016

(87) PCT Pub. No.: WO2016/017093
PCT Pub. Date: Feb. 4, 2016

(65) Prior Publication Data
US 2017/0141391 A1    May 18, 2017

(30) Foreign Application Priority Data
Jul. 30, 2014   (JP) .................... 2014-154464

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/131* (2013.01); *H01M 4/362* (2013.01); *H01M 4/485* (2013.01);
(Continued)

(58) Field of Classification Search
CPC ...... H01M 4/525; H01M 4/131; H01M 4/485; H01M 4/621; H01M 2004/028
(Continued)

(56) References Cited

U.S. PATENT DOCUMENTS 8,080,335 B2 * 12/2011 Kawakami ............. H01G 9/155
252/182.1
2006/0177739 A1   8/2006 Endo et al.
(Continued)

FOREIGN PATENT DOCUMENTS

JP    2004-220909 A    8/2004
JP    2007-59142 A    3/2007
(Continued)

OTHER PUBLICATIONS

International Search Report dated Oct. 20, 2015, issued in counterpart International Application No. PCT/JP2015/003550 (2 pages).
(Continued)

*Primary Examiner* — Harold Y Pyon
*Assistant Examiner* — Danny N Kang
(74) *Attorney, Agent, or Firm* — Westerman, Hattori, Daniels & Adrian, LLP

(57) ABSTRACT

There is provided a positive electrode active material for a nonaqueous electrolyte secondary battery capable of suppressing an increase in DCR during cycles. There is provided a positive electrode active material for a nonaqueous electrolyte secondary battery that includes a secondary particle formed by aggregation of primary particles formed of a lithium transition metal oxide. A rare-earth compound secondary particle formed by aggregation of particles formed of a rare-earth compound adheres to a recess formed between primary particles adjacent to each other on a surface of the secondary particle, and the rare-earth compound secondary particle adheres to both the primary par-
(Continued)

ticles adjacent to each other in the recess. A tungsten-containing compound adheres to an interface of primary particles inside the secondary particle formed of the lithium transition metal oxide.

10 Claims, 2 Drawing Sheets

(51) Int. Cl.
| | |
|---|---|
| *H01M 4/131* | (2010.01) |
| *H01M 4/485* | (2010.01) |
| *H01M 4/62* | (2006.01) |
| *H01M 4/36* | (2006.01) |
| *H01M 4/02* | (2006.01) |

(52) U.S. Cl.
CPC ........ *H01M 4/621* (2013.01); *H01M 10/0525* (2013.01); *H01M 2004/028* (2013.01)

(58) Field of Classification Search
USPC ........................................................ 252/500
See application file for complete search history.

(56) References Cited

U.S. PATENT DOCUMENTS

| | | | |
|---|---|---|---|
| 2011/0117434 A1* | 5/2011 | Ogasawara ........... | H01M 4/131 429/223 |
| 2013/0183585 A1* | 7/2013 | Sun ....................... | H01M 4/505 429/223 |
| 2013/0302689 A1 | 11/2013 | Jito et al. | |
| 2015/0270533 A1 | 9/2015 | Takanashi et al. | |

FOREIGN PATENT DOCUMENTS

| | | |
|---|---|---|
| JP | 2013-125732 A | 6/2013 |
| JP | 2013-235666 A | 11/2013 |
| WO | 2005/008812 A1 | 1/2005 |
| WO | 2012/056834 A1 | 5/2012 |
| WO | 2012/086277 A1 | 6/2012 |
| WO | 2014/068831 A1 | 5/2014 |
| WO | 2015/125444 A1 | 8/2015 |

OTHER PUBLICATIONS

English translation of Search Report dated Sep. 4, 2018, issued in counterpart Chinese Application No. 201580035602.3. (2 pages).

* cited by examiner

POSITIVE ELECTRODE ACTIVE MATERIAL FOR NONAQUEOUS ELECTROLYTE SECONDARY BATTERY

TECHNICAL FIELD

The present invention relates to a positive electrode active material for nonaqueous electrolyte secondary batteries.

BACKGROUND ART

In recent years, nonaqueous electrolyte secondary batteries have been required to have high capacity that allows long-term operation and improved output characteristics in the case where charge and discharge are repeatedly performed with a large current within a relatively short time.

PTL 1 below suggests that when a group III element on the periodic table is provided on surfaces of base particles serving as a positive electrode active material, the reaction between the positive electrode active material and an electrolytic solution can be suppressed even in the case where the charge voltage is increased, which suppresses the degradation of charge storage characteristics.

PTL 2 below suggests that when a positive electrode active material in which fine particles containing lithium tungstate are formed on surfaces of primary particles is used, the initial discharge capacity is increased, which reduces the resistance of a positive electrode.

CITATION LIST

Patent Literature

PTL 1: International Publication No. 2005/008812
PTL 2: Japanese Published Unexamined Patent Application No. 2013-125732

SUMMARY OF INVENTION

Technical Problem

However, it has been found that the use of the techniques disclosed in PTL 1 and PTL 2 still poses a problem in that the direct current resistance (hereafter may be referred to as DCR) after high-temperature cycles is increased, that is, the output characteristics are degraded.

Solution to Problem

Accordingly, a positive electrode active material for a nonaqueous electrolyte secondary battery according to the present invention includes a secondary particle formed by aggregation of primary particles formed of a lithium transition metal oxide. A rare-earth compound secondary particle formed by aggregation of particles formed of a rare-earth compound adheres to a recess formed between primary particles adjacent to each other on a surface of the secondary particle, and the rare-earth compound secondary particle adheres to both the primary particles adjacent to each other in the recess. A tungsten-containing compound adheres to an interface of primary particles inside the secondary particle formed of the lithium transition metal oxide.

Advantageous Effects of Invention

According to the present invention, there can be provided a positive electrode active material for nonaqueous electrolyte secondary batteries capable of suppressing an increase in DCR during high-temperature cycles.

DESCRIPTION OF EMBODIMENTS

Figure 1:
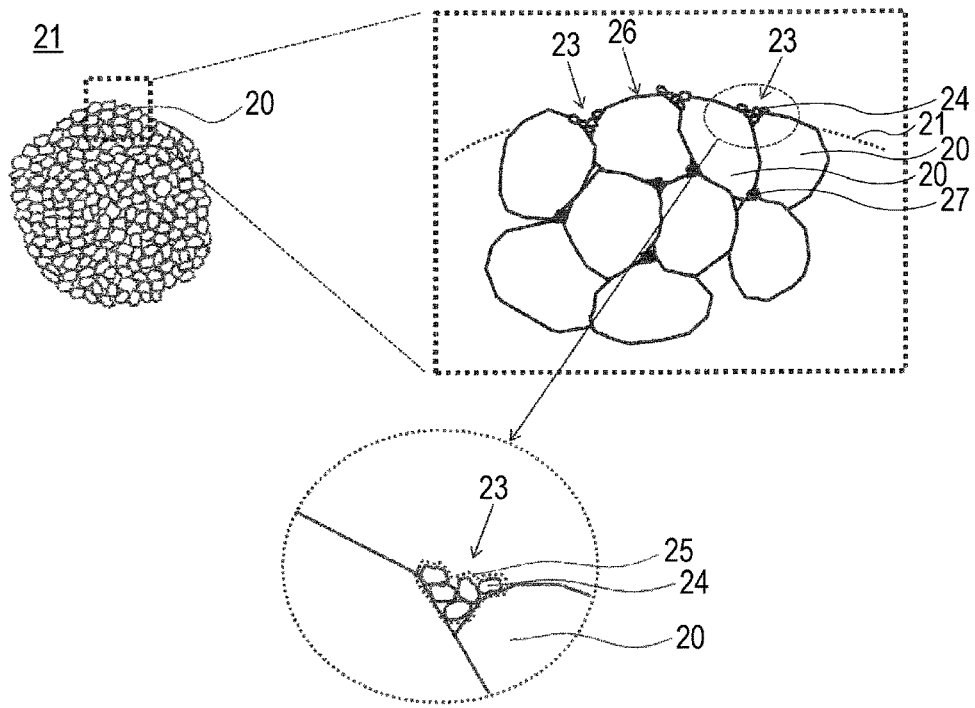
FIG. 1 includes a cross-sectional view schematically illustrating a positive electrode active material particle and a partially enlarged cross-sectional view schematically illustrating the positive electrode active material according to an embodiment and Experimental Example 1 of the present invention.

An embodiment of the present invention will be described below. This embodiment is merely an example for carrying out the present invention, and the present invention is not limited to the embodiment and can be appropriately modified without changing the spirit of the present invention. The drawings referred to in the description of the embodiment and Experimental Examples are schematically illustrated. The dimensions and amounts of constituent elements in the drawings may be different from those of actual elements.

A nonaqueous electrolyte secondary battery according to an embodiment of the present invention includes a positive electrode containing a positive electrode active material, a negative electrode containing a negative electrode active material, a nonaqueous electrolyte containing a nonaqueous solvent, and a separator. For example, the nonaqueous electrolyte secondary battery has a structure in which an electrode body obtained by winding a positive electrode and a negative electrode with a separator disposed therebetween and a nonaqueous electrolyte are accommodated in a case.

[Positive Electrode]

A positive electrode active material includes a secondary particle formed by aggregation of primary particles formed of a lithium transition metal oxide. A rare-earth compound secondary particle formed by aggregation of primary particles formed of a rare-earth compound adheres to a recess formed between primary particles adjacent to each other on a surface of the secondary particle, and the rare-earth compound secondary particle adheres to both the primary particles adjacent to each other in the recess. A tungsten-containing compound adheres to an interface of primary particles inside the secondary particle formed of the lithium transition metal oxide.

Hereafter, the structure of the positive electrode active material for nonaqueous electrolyte secondary batteries will be described in detail with reference to FIG. 1. As illustrated in FIG. 1, the positive electrode active material includes lithium transition metal oxide secondary particles 21 formed by aggregation of lithium transition metal oxide primary particles 20. Rare-earth compound secondary particles 25 formed by aggregation of rare-earth compound primary particles 24 adhere to recesses 23 formed between lithium transition metal oxide primary particles 20 adjacent to each other on the surfaces of the lithium transition metal oxide secondary particles 21. Furthermore, the rare-earth compound secondary particles 25 adhere to both the lithium transition metal oxide primary particles 20 adjacent to each other in the recesses 23. In the positive electrode active material, a tungsten-containing compound 27 adheres to interfaces of the lithium transition metal oxide primary particles 20 inside the lithium transition metal oxide secondary particles 21. The tungsten-containing compound 27 preferably adheres to both primary particles 20 adjacent to or facing each other.

In the above structure, since the rare-earth compound secondary particles 25 adhere to both the lithium transition metal oxide primary particles 20 adjacent to each other in the recesses 23, the surface alteration of the lithium transition metal oxide primary particles 20 adjacent to each other during charge-discharge cycles at high temperatures can be suppressed and also the cracking at the interfaces of the primary particles in the recesses 23 can be suppressed. In addition, the rare-earth compound secondary particles 25 produce an effect of fixing (bonding) the lithium transition metal oxide primary particles 20 adjacent to each other. Therefore, even if the positive electrode active material is repeatedly subjected to expansion and shrinkage during charge-discharge cycles at high temperatures, the cracking at the interfaces of the primary particles in the recesses 23 is suppressed.

In the above structure, the tungsten-containing compound 27 adheres to the interfaces of the primary particles inside the lithium transition metal oxide secondary particles 21 even at high temperatures. Therefore, the surface alteration of the primary particles inside the lithium transition metal oxide secondary particles 21 and the cracking at the interfaces of the primary particles are suppressed during charge-discharge cycles at high temperatures. Furthermore, since the rare-earth compound secondary particles 25 adhere to both the lithium transition metal oxide primary particles 20 adjacent to each other in the recesses 23 of the lithium transition metal oxide secondary particles 21, the elution of the tungsten-containing compound 27 is suppressed even at high temperatures.

In the above structure, as described above, the surface alteration and cracking of the positive electrode active material are suppressed on the surface of and inside the positive electrode active material during charge-discharge cycles at high temperatures.

The phrase "the rare-earth compound secondary particles adhere to both the lithium transition metal oxide primary particles adjacent to each other in the recesses" refers to a state in which, when the cross-section of lithium transition metal oxide particles is observed, the rare-earth compound secondary particles adhere to both the surfaces of the lithium transition metal oxide primary particles adjacent to each other in the recesses that are formed between the lithium transition metal oxide primary particles adjacent to each other on the surfaces of the lithium transition metal oxide secondary particles.

The rare-earth compound is preferably at least one compound selected from the group consisting of rare-earth hydroxides, oxyhydroxides, oxides, carbonates, phosphates, and fluorides. Among them, the rare-earth compound is particularly preferably at least one compound selected from the group consisting of rare-earth hydroxides and oxyhydroxides because such a rare-earth compound produces a larger effect of suppressing the surface alteration caused at the interfaces of the primary particles.

Examples of a rare-earth element in the rare-earth compound include scandium, yttrium, lanthanum, cerium, praseodymium, neodymium, samarium, europium, gadolinium, terbium, dysprosium, holmium, erbium, thulium, ytterbium, and lutetium. Among them, neodymium, samarium, and erbium are particularly preferred. This is because compounds of neodymium, samarium, and erbium produce a larger effect of suppressing the surface alteration caused at the interfaces of the primary particles than other rare-earth compounds.

Specific examples of the rare-earth compound include hydroxides and oxyhydroxides such as neodymium hydroxide, neodymium oxyhydroxide, samarium hydroxide, samarium oxyhydroxide, erbium hydroxide, and erbium oxyhydroxide; phosphates and carbonates such as neodymium phosphate, samarium phosphate, erbium phosphate, neodymium carbonate, samarium carbonate, and erbium carbonate; and oxides and fluorides such as neodymium oxide, samarium oxide, erbium oxide, neodymium fluoride, samarium fluoride, and erbium fluoride.

The average particle size of the rare-earth compound primary particles is preferably 5 nm or more and 100 nm or less and more preferably 5 nm or more and 80 nm or less.

The average particle size of the rare-earth compound secondary particles is preferably 100 nm or more and 400 nm or less and more preferably 150 nm or more and 300 nm or less. If the average particle size is more than 400 nm, the particle size of the rare-earth compound secondary particles is excessively increased, which decreases the number of lithium transition metal oxide recesses to which the rare-earth compound secondary particles adhere. Consequently, there are many lithium transition metal oxide recesses that are not protected by the rare-earth compound secondary particles, which may reduce an effect of suppressing an increase in DCR. If the average particle size is less than 100 nm, the contact area of the rare-earth compound secondary particles between the lithium transition metal oxide primary particles is decreased. As a result, the effect of fixing (bonding) the lithium transition metal oxide primary particles adjacent to each other is reduced, which may reduce an effect of suppressing the cracking of surfaces of the secondary particles at the interfaces of the primary particles.

The average particle size of the lithium transition metal oxide secondary particles is preferably 2 μm or more and 40 μm or less and more preferably 4 μm or more and 20 μm or less. If the average particle size is less than 2 μm, the lithium transition metal oxide secondary particles are excessively small as secondary particles and high density required for the positive electrode is not achieved, which may make it difficult to achieve high capacity. If the average particle size is more than 40 μm, output at low temperatures is sometimes not sufficiently obtained. The lithium transition metal oxide secondary particles are formed by bonding (aggregation) of the lithium transition metal oxide primary particles.

The average particle size of the lithium transition metal oxide primary particles is preferably 100 nm or more and 5 μm or less and more preferably 300 nm or more and 2 μm or less. If the average particle size is less than 100 nm, the amount of interfaces of the primary particles (including primary particles inside the secondary particles) is excessively increased, which may easily cause cracking due to expansion and shrinkage during cycles. If the average particle size is more than 5 μm, the amount of interfaces of the primary particles (including primary particles inside the secondary particles) is excessively decreased, which may decrease the output at low temperatures. Since secondary particles are formed by aggregation of primary particles, the lithium transition metal oxide primary particles are never larger than the lithium transition metal oxide secondary particles.

The content (coating mass) of the rare-earth compound is preferably 0.005 mass % or more and 0.5 mass % or less and more preferably 0.05 mass % or more and 0.3 mass % or less in terms of rare-earth element relative to the total mass of the lithium transition metal oxide. If the content is less than 0.005 mass %, the amount of the rare-earth compound that adheres to the recesses between the lithium transition metal oxide primary particles decreases. Consequently, the above-described effect of the rare-earth compound is not sufficiently produced, which may fail to suppress an increase in DCR after cycles. If the content is more than 0.5 mass %, the rare-earth compound not only covers portions between the lithium transition metal oxide primary particles, but also excessively covers the surfaces of the lithium transition metal oxide secondary particles, which may degrade the initial charge-discharge characteristics.

Examples of the tungsten-containing compound include tungsten trioxide ($WO_3$), tungsten dioxide ($WO_2$), and lithium tungstate. In particular, lithium tungstate is preferred because lithium tungstate has higher lithium ion conductivity than tungsten oxide. Examples of the lithium tungstate include $Li_2WO_4$, $Li_4WO_5$, and $Li_6W_2O_9$.

The tungsten-containing compound adheres to the interfaces of the primary particles inside the lithium transition metal oxide secondary particles and may also adhere to the interfaces of the primary particles on the surfaces of the lithium transition metal oxide secondary particles.

The content of the tungsten-containing compound is preferably 0.1 mass % or more and 5.0 mass % or less and particularly preferably 0.3 mass % or more and 3.0% or less in terms of tungsten element relative to the total mass of the lithium transition metal oxide. If the content of the tungsten compound is less than 0.1 mass %, an effect of suppressing the surface alteration of the primary particles inside the secondary particles tends to be not sufficiently produced. If the content is 5.0 mass % or more, the diffusion of lithium ions between the lithium transition metal oxide and the electrolytic solution tends to be inhibited. In this specification, the phrase "the content of the tungsten-containing compound relative to the total mass of the lithium transition metal oxide" refers to, when the whole tungsten-containing compound is assumed to be present in the form of tungsten, a ratio of the mass of the tungsten-containing compound that adheres to the inside and surfaces of the lithium transition metal oxide secondary particles to the total mass of the lithium transition metal oxide.

The tungsten compound according to the present invention is present at the interfaces of the primary particles inside the secondary particles. For example, when nickel-cobalt-aluminum oxide, lithium hydroxide, and tungsten oxide are mixed and fired, tungsten is sometimes partially substituted with nickel or cobalt to form solid solution. However, this state is not a state in which the tungsten compound is present at the interfaces of the primary particles in the present invention.

The lithium transition metal composite oxide preferably contains Ni in an amount of 80% or more relative to the total amount of the metal elements other than lithium from the viewpoints of not only a further increase in the positive electrode capacity but also ease of a proton exchange reaction at the interfaces of the primary particles described later. That is, when the total molar quantity of metals other than Li in the lithium transition metal oxide is assumed to be 1, the proportion of nickel is preferably 80% or more. Specific examples of the lithium transition metal composite oxide include lithium-containing nickel-manganese composite oxide, lithium-containing nickel-cobalt-manganese composite oxide, lithium-containing nickel-cobalt composite oxide, and lithium-containing nickel-cobalt-aluminum composite oxide. The lithium-containing nickel-cobalt-aluminum composite oxide may have a composition containing nickel, cobalt, and aluminum at a molar ratio of, for example, 8:1:1, 82:15:3, or 94:3:3. They may be used alone or in combination.

In the lithium transition metal composite oxide, the proportion of cobalt in the lithium transition metal oxide is preferably 7 mol % or less and more preferably 5 mol % or less relative to the total molar quantity of metal elements other than lithium. If the proportion of the cobalt is excessively small, the structure readily changes during charge and discharge and cracking tends to readily occur at the interfaces of the particles. Therefore, the DCR during high-temperature cycles readily increases in a lithium transition metal composite oxide whose cobalt proportion is 7 mol % or less. When the rare-earth compound and the tungsten-containing compound are caused to adhere to the lithium transition metal composite oxide particles whose cobalt proportion is 7 mol % or less as illustrated in FIG. 1, the surface alteration and cracking of the lithium transition metal composite oxide particles are suppressed on the surfaces of and inside the particles, which considerably produces an effect of suppressing an increase in the DCR.

In the lithium transition metal composite oxide with a Ni proportion (Ni percentage) of 80% or more, the proportion of trivalent nickel is high and thus a proton exchange reaction between water and lithium in the lithium transition metal oxide readily occurs in the water. Consequently, a large amount of LiOH generated as a result of the proton exchange reaction appears on the surfaces of the secondary particles from the inside of the interfaces of the lithium transition metal oxide primary particles. Thus, the alkali ($OH^-$) concentration in portions between the lithium transition metal oxide primary particles adjacent to each other on the surfaces of the lithium transition metal oxide secondary particles becomes higher than that in the surrounding portions. Rare-earth compound primary particles are attracted by alkali and aggregated in the recesses formed between the primary particles, and are easily precipitated while forming secondary particles. In the lithium transition metal composite oxide with a Ni proportion of less than 80%, the proportion of trivalent nickel is low, which makes it difficult to cause the proton exchange reaction. Therefore, the alkali concentration in portions between the lithium transition metal oxide primary particles is substantially the same as that in the surrounding portions. Thus, even in the case where the precipitated rare-earth compound primary particles are bonded to form secondary particles, when the secondary particles adhere to the surface of the lithium transition metal oxide, the secondary particles tend to adhere to protruding portions of the lithium transition metal oxide primary particles with which the secondary particles are likely to collide.

The lithium transition metal oxide may contain other additional elements. Examples of the additional elements include boron (B), magnesium (Mg), aluminum (Al), titanium (Ti), chromium (Cr), iron (Fe), copper (Cu), zinc (Zn), niobium (Nb), molybdenum (Mo), tantalum (Ta), zirconium (Zr), tin (Sn), tungsten (W), sodium (Na), potassium (K), barium (Ba), strontium (Sr), calcium (Ca), and bismuth (Bi).

The lithium transition metal oxide is preferably stirred in a certain amount of water to remove an alkali component that adheres to the surface of the lithium transition metal oxide from the viewpoint of providing batteries having excellent high-temperature storage characteristics.

In the production of the positive electrode active material for nonaqueous electrolyte secondary batteries according to this embodiment, a rare-earth compound is caused to adhere to the surfaces of lithium transition metal oxide secondary particles and then tungsten may be caused to adhere to the interfaces of primary particles inside the lithium transition metal oxide secondary particles, or tungsten is caused to adhere to the interfaces of primary particles inside lithium transition metal oxide secondary particles and then a rare-earth compound may be caused to adhere to the surfaces of the lithium transition metal oxide secondary particles. The rare-earth compound can be caused to adhere to the surfaces of the lithium transition metal oxide secondary particles by, for example, a method in which an aqueous solution containing a rare-earth element is added to a suspension containing a lithium transition metal oxide. Tungsten can be caused to adhere to the interfaces of the primary particles inside the lithium transition metal oxide secondary particles by, for example, a method in which an aqueous solution containing tungsten is added to a lithium transition metal oxide or a suspension containing a lithium transition metal oxide.

When the rare-earth compound is caused to adhere to the surfaces of the lithium transition metal oxide secondary particles, the pH of the suspension is desirably adjusted to 11.5 or more and preferably 12 or more while the aqueous solution in which the compound containing a rare-earth element has been dissolved is added to the suspension. Under this condition, rare-earth compound particles are likely to unevenly adhere to the surfaces of the lithium transition metal oxide secondary particles. If the pH of the suspension is 6 or more and 10 or less, the rare-earth compound particles evenly adhere to the entire surfaces of the lithium transition metal oxide secondary particles, which may fail to sufficiently suppress the cracking of an active material due to the surface alteration that occurs at the interfaces of the primary particles on the surfaces of the secondary particles. If the pH is less than 6, at least part of the lithium transition metal oxide may be dissolved.

The pH of the suspension is desirably adjusted to 14 or less and preferably 13 or less. If the pH is more than 14, the size of the rare-earth compound primary particles is excessively increased. In addition, an excess amount of alkali is left in the lithium transition metal oxide particles, which may cause gelation during the preparation of slurry or may excessively generate gas during the storage of batteries.

In the case where the aqueous solution in which the compound containing a rare-earth element has been dissolved is added to the suspension containing a lithium transition metal oxide, when the aqueous solution is simply used, a rare-earth hydroxide is precipitated. When a fluorine source is sufficiently added to the suspension, a rare-earth fluoride is precipitated. When carbon dioxide is sufficiently dissolved, a rare-earth carbonate is precipitated. When phosphate ions are sufficiently added to the suspension, a rare-earth phosphate is precipitated. Thus, the rare-earth compound can be precipitated on the surfaces of the lithium transition metal oxide particles. By controlling dissolved ions in the suspension, for example, a rare-earth compound including a hydroxide and a fluoride in a mixed manner is also obtained.

The lithium transition metal oxide particles having surfaces on which the rare-earth compound has been precipitated are preferably heat-treated. The heat treatment temperature is preferably 80° C. or higher and 500° C. or lower and more preferably 80° C. or higher and 400° C. or lower. If the heat treatment temperature is lower than 80° C., it may take an excessive time to sufficiently dry the positive electrode active material obtained through the heat treatment. If the heat treatment temperature is higher than 500° C., a part of the rare-earth compound that adheres to the surfaces diffuses into the lithium transition metal composite oxide particles, which may reduce an effect of suppressing the surface alteration that occurs at the interfaces of the primary particles on the surfaces of the lithium transition metal oxide secondary particles. When the heat treatment temperature is 400° C. or lower, almost no rare-earth element diffuses into the lithium transition metal composite oxide particles and the rare-earth element firmly adheres to the interfaces of the primary particles, which improves an effect of suppressing the surface alteration that occurs at the interfaces of the primary particles on the surfaces of the lithium transition metal oxide secondary particles and an effect of bonding the primary particles. In the case where a rare-earth hydroxide is caused to adhere to the interfaces of the primary particles, most of the hydroxide changes into an oxyhydroxide at about 200° C. to about 300° C., and furthermore changes into an oxide at about 450° C. to about 500° C. Therefore, when the heat treatment is performed at 400° C. or lower, a rare-earth hydroxide or oxyhydroxide that produces a large effect of suppressing surface alteration can be selectively provided to the interfaces of the lithium transition metal oxide primary particles, which produces a good effect of suppressing the DCR.

The lithium transition metal oxide having a surface on which the rare-earth compound has been precipitated is preferably heat-treated in a vacuum. The reason for this is as follows. The moisture of the suspension used when the rare-earth compound is caused to adhere penetrates to the inside of the lithium transition metal oxide particles. When the rare-earth compound secondary particles adhere to the recesses formed at the interfaces of the primary particles on the surfaces of the lithium transition metal oxide secondary particles, moisture is not easily removed from the inside during the drying. Therefore, the moisture is not effectively removed unless the heat treatment is performed in a vacuum. This increases the amount of moisture brought into a battery from the positive electrode active material. Consequently, a product generated as a result of a reaction of the moisture and an electrolyte may alter the surface of the active material.

The lithium transition metal oxide to which the tungsten compound has adhered is preferably heat-treated in a vacuum. The reason for this is the same as above. The moisture is not effectively removed unless the heat treatment is performed in a vacuum. This increases the amount of moisture brought into a battery from the positive electrode active material. Consequently, a product generated as a result of a reaction of the moisture and an electrolyte may alter the surface of the active material. Furthermore, when the heat treatment is performed in a vacuum, the tungsten compound is absorbed into the secondary particles, and thus can be efficiently provided to the interfaces of the primary particles inside the secondary particles.

The aqueous solution containing a rare-earth element can be prepared by dissolving a substance such as an acetate, a nitrate, a sulfate, an oxide, or a chloride in water or an organic solvent. Such a substance is preferably dissolved in water because high solubility is achieved. In particular, when a rare-earth oxide is used, an aqueous solution prepared by dissolving a rare-earth sulfate, chloride, or nitrate that is prepared by dissolving the rare-earth oxide in an acid such as sulfuric acid, hydrochloric acid, nitric acid, or acetic acid can also be used because such an aqueous solution is equivalent to the above aqueous solution prepared by dissolving a compound in water.

When the rare-earth compound is caused to adhere to the surfaces of the lithium transition metal oxide secondary particles by a method in which the lithium transition metal oxide and the rare-earth compound are mixed with each other in a dry process, the rare-earth compound particles randomly adhere to the surfaces of the lithium transition metal oxide secondary particles, which makes it difficult to cause the rare-earth compound particles to selectively adhere to the interfaces of the primary particles on the surfaces of the secondary particles. When the method using a dry process is employed, the rare-earth compound does not firmly adhere to the lithium transition metal oxide, and thus an effect of fixing (bonding) the primary particles is not produced. Furthermore, when a positive electrode mixture is prepared by adding a conductive agent, a binding agent, and the like, the rare-earth compound is easily separated from the lithium transition metal oxide.

The positive electrode active material is not limited to the case where the above-described positive electrode active material particles are used alone. The above-described positive electrode active material may be used in combination with other positive electrode active materials. The positive electrode active material is not particularly limited as long as it is a compound capable of reversibly intercalating and deintercalating lithium ions. Examples of the compound include compounds having a layered structure and being capable of intercalating and deintercalating lithium ions while a stable crystal structure is maintained, such as lithium cobaltate and lithium-nickel-cobalt-manganese oxide, compounds having a spinel structure, such as lithium-manganese oxide and lithium-nickel-manganese oxide, and compounds having an olivine structure. When only positive electrode active materials of the same type are used or when different types of positive electrode active materials are used, the positive electrode active materials may have the same particle size or different particle sizes.

A positive electrode containing the above positive electrode active material suitably includes a positive electrode current collector and a positive electrode mixture layer formed on the positive electrode current collector. The positive electrode mixture layer preferably contains a binding agent and a conductive agent, in addition to the positive electrode active material particles. The positive electrode current collector is formed of, for example, a conductive thin film such as a metal foil or alloy foil of aluminum or the like which is stable in the potential range of a positive electrode or a film including a metal surface layer made of aluminum or the like.

The binding agent may be, for example, a fluoropolymer or a rubber polymer. Examples of the fluoropolymer include polytetrafluoroethylene (PTFE), polyvinylidene fluoride (PVdF), and modified products of the foregoing. Examples of the rubber polymer include ethylene-propylene-isoprene copolymers and ethylene-propylene-butadiene copolymers. They may be used alone or in combination of two or more. The binding agent may be used together with a thickener such as carboxymethyl cellulose (CMC) or polyethylene oxide (PEO).

The conductive agent may be, for example, a carbon material such as carbon black, acetylene black, Ketjenblack, graphite, or vapor-grown carbon fiber (VGCF). They may be used alone or in combination of two or more.

[Negative Electrode]

A negative electrode is produced by, for example, mixing a negative electrode active material and a binding agent with water or an appropriate solvent, applying the resulting mixture to a negative electrode current collector, and drying and rolling the negative electrode current collector. The negative electrode current collector is suitably formed of, for example, a conductive thin film such as a metal foil or alloy foil of copper or the like which is stable in the potential range of a negative electrode or a film including a metal surface layer made of copper or the like. The binding agent may be, for example, PTFE as in the case of the positive electrode, but is preferably a styrene-butadiene copolymer (SBR) or a modified product thereof. The binding agent may be used together with a thickener such as CMC.

Any negative electrode active material capable of reversibly occluding and releasing lithium ions can be used. Examples of the negative electrode active material include carbon materials, metals such as Si and Sn and alloy materials that form alloys with lithium, and metal oxides such as $SiO_x$ ($0<X<2$). These negative electrode active materials may be used alone or in combination of two or more.

[Nonaqueous Electrolyte]

A solvent of the nonaqueous electrolyte is, for example, a cyclic carbonate, a chain carbonate, or a cyclic carboxylate. Examples of the cyclic carbonate include propylene carbonate (PC) and ethylene carbonate (EC). Examples of the chain carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). These nonaqueous solvents may be used alone or in combination of two or more.

A solute of the nonaqueous electrolyte is, for example, $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, or $LiAsF_6$. Alternatively, a lithium salt containing an oxalato complex as an anion may also be used. Examples of the lithium salt include LiBOB [lithium bisoxalate borate], $Li[B(C_2O_4)F_2]$, $Li[P(C_2O_4)F_4]$, and $Li[P(C_2O_4)_2F_2]$. These solutes may be used alone or in combination of two or more.

[Separator]

A known separator may be used. Examples of the separator include polypropylene separators, polyethylene separators, polypropylene-polyethylene multilayer separators, and separators whose surface is coated with a resin such as an aramid resin.

A layer formed of a known inorganic filler may be formed at an interface between the positive electrode and the separator or at an interface between the negative electrode and the separator. Examples of the filler include oxides and phosphates containing one or more elements such as titanium, aluminum, silicon, and magnesium; and those obtained by surface-treating the oxides and phosphates with a hydroxide or the like.

EXAMPLES

Hereafter, Experimental Examples in Description of Embodiments are used to more specifically describe the present invention in detail. The present invention is not limited to Experimental Examples below, and can be appropriately modified without changing the spirit of the present invention.

First Experimental Example

Experimental Example 1

[Production of Positive Electrode Active Material]

LiOH and an oxide obtained by oxidizing, at 500° C., a nickel-cobalt-aluminum composite hydroxide represented by $Ni_{0.94}Co_{0.03}Al_{0.03}(OH)_2$ and obtained by coprecipitation were mixed with each other in an Ishikawa grinding mixer so that the molar ratio of Li and all transition metals was 1.05:1. Subsequently, the resulting mixture was heat-treated in an oxygen atmosphere at 760° C. for 20 hours and then pulverized to obtain lithium-nickel-cobalt-aluminum composite oxide particles having an average secondary particle size of about 15 μm and represented by $Li_{1.05}Ni_{0.94}Co_{0.03}Al_{0.03}O_2$.

To 1.5 L of pure water, 1000 g of the thus-obtained lithium-nickel-cobalt-aluminum composite oxide particles serving as a lithium transition metal oxide were added and stirred to prepare a suspension in which the lithium transition metal oxide was dispersed in the pure water. Subsequently, an aqueous erbium sulfate solution prepared by dissolving erbium oxide in sulfuric acid and having a concentration of 0.1 mol/L was added to the suspension a plurality of times. The pH of the suspension was maintained at 11.5 to 12.0 while the aqueous erbium sulfate solution was added to the suspension.

The suspension was then filtered to obtain a powder. An aqueous solution (hereafter, this solution may be referred to as a tungsten aqueous solution in Experimental Examples) prepared by dissolving 59 g of tungsten oxide ($WO_3$) and 24 g of lithium hydroxide (anhydride) in 460 ml of pure water was sprayed onto the powder. The powder was dried in a vacuum at 200° C. to produce a positive electrode active material.

The surface of the positive electrode active material was observed with a scanning electron microscope (SEM). It was confirmed that erbium hydroxide secondary particles having an average particle size of 100 to 200 nm and formed by aggregation of erbium hydroxide primary particles having an average particle size of 20 to 30 nm adhered to the surfaces of the lithium transition metal oxide secondary particles. It was also confirmed that almost all the erbium hydroxide secondary particles adhered to recesses formed between the lithium transition metal oxide primary particles adjacent to each other on the surfaces of the lithium transition metal oxide secondary particles so as to be in contact with both the primary particles adjacent to each other in the recesses. Furthermore, the coating mass of the erbium compound was measured by inductively coupled plasma (ICP) emission spectrometry. The coating mass was 0.15 mass % relative to the lithium-nickel-cobalt-aluminum composite oxide in terms of erbium element.

The cross-section of the positive electrode active material was observed with a scanning electron microscope (SEM). It was confirmed that a tungsten compound was present at the interfaces of the primary particles inside the secondary particles. The coating mass of the tungsten compound was measured by inductively coupled plasma (ICP) emission spectrometry. The coating mass was 0.67 mass % relative to the lithium-nickel-cobalt-aluminum composite oxide in terms of tungsten element.

In Experimental Example 1, it is believed that the pH of the suspension is as high as 11.5 to 12.0, and thus the secondary particles are formed as a result of bonding (aggregation) of the erbium hydroxide primary particles precipitated in the suspension. In Experimental Example 1, the Ni proportion is as high as 94%, which increases the proportion of trivalent nickel. This facilitates proton exchange between $LiNiO_2$ and $H_2O$ at the interfaces of the lithium transition metal oxide primary particles, and a large amount of LiOH generated as a result of the proton exchange reaction appears from the inside of the interfaces between the primary particles adjacent to each other on the surfaces of the lithium transition metal oxide secondary particles. This increases the alkali concentration in portions between the primary particles adjacent to each other on the surface of the lithium transition metal oxide. Thus, the erbium hydroxide particles precipitated in the suspension are attracted by alkali and aggregated in the recesses formed at the interfaces of the primary particles, and precipitated while forming secondary particles.

[Production of Positive Electrode]

The positive electrode active material particles, carbon black serving as a conductive agent, and an N-methyl-2-pyrrolidone solution in which polyvinylidene fluoride serving as a binding agent was dissolved were weighed so that the mass ratio of the positive electrode active material particles, the conductive agent, and the binding agent was 100:1:1. They were kneaded using a T.K. HIVIS MIX (manufactured by PRIMIX Corporation) to prepare a positive electrode mixture slurry.

Subsequently, the positive electrode mixture slurry was applied onto both surfaces of a positive electrode current collector formed of an aluminum foil, dried, and then rolled with a reduction roller. An aluminum current collecting tab was attached thereto to produce a positive electrode plate including positive electrode mixture layers formed on both surfaces of the positive electrode current collector. The packing density of the positive electrode active material in the positive electrode was 3.60 g/cm$^3$.

[Production of Negative Electrode]

Artificial graphite serving as a negative electrode active material, CMC (sodium carboxymethyl cellulose) serving as a dispersant, and SBR (styrene-butadiene rubber) serving as a binding agent were mixed at a mass ratio of 100:1:1 in an aqueous solution to prepare a negative electrode mixture slurry. Subsequently, the negative electrode mixture slurry was uniformly applied onto both surfaces of a negative electrode current collector formed of a copper foil, dried, and rolled with a reduction roller. A nickel current collecting tab was attached thereto to produce a negative electrode plate including negative electrode mixture layers formed on both surfaces of the negative electrode current collector. The packing density of the negative electrode active material in the negative electrode was 1.75 g/cm$^3$.

[Preparation of Nonaqueous Electrolytic Solution]

Lithium hexafluorophosphate ($LiPF_6$) was dissolved in a mixed solvent prepared by mixing ethylene carbonate (EC), methyl ethyl carbonate (MEC), and dimethyl carbonate (DMC) at a volume ratio of 2:2:6 so that the concentration of $LiPF_6$ was 1.3 mol/L. A nonaqueous electrolytic solution was prepared by dissolving 2.0 mass % of vinylene carbonate (VC) in the above mixed solvent.

[Production of Battery]

The thus-produced positive electrode and negative electrode were wound around a winding core in a spiral fashion with a separator disposed between the electrodes. Then, the winding core was pulled out to produce a spiral electrode body. Subsequently, the spiral electrode body was flattened to obtain a flat electrode body. Then, the flat electrode body and the nonaqueous electrolytic solution were inserted into an aluminum laminate case to produce a battery A1. The battery has a thickness of 3.6 mm, a width of 35 mm, and a length of 62 mm. When the nonaqueous electrolyte secondary battery was charged to 4.20 V and discharged to 3.0 V, the discharge capacity was 950 mAh.

Experimental Example 2

A battery A2 was produced in the same manner as in Experimental Example 1, except that the powder obtained after the filtration was dried in a vacuum at 200° C. without being sprayed with the tungsten aqueous solution in the production of the positive electrode active material in Experimental Example 1.

Experimental Example 3

A battery A3 was produced in the same manner as in Experimental Example 1, except that a positive electrode active material was produced in the same manner as in Experimental Example 1 except that the pH of the suspension was maintained at 9 while the aqueous erbium sulfate solution was added to the suspension in the production of the positive electrode active material in Experimental Example 1. Herein, 10 mass % of an aqueous sodium hydroxide solution was appropriately added to adjust the pH of the suspension to 9.

The surface of the positive electrode active material was observed with a SEM. It was confirmed that erbium hydroxide primary particles having an average particle size of 10 nm to 50 nm uniformly adhered to the entire surfaces (both protruding portions and recesses) of the lithium transition metal oxide secondary particles without forming secondary particles. The coating mass of the erbium compound was measured by inductively coupled plasma (ICP) emission spectrometry. The coating mass was 0.15 mass % relative to the lithium-nickel-cobalt-aluminum composite oxide in terms of erbium element.

The cross-section of the positive electrode active material was observed with a scanning electron microscope (SEM). It was confirmed that the tungsten compound was present at the interfaces of the primary particles inside the secondary particles. The coating mass of the tungsten compound was measured by inductively coupled plasma (ICP) emission spectrometry. The coating mass was 0.67 mass % relative to the lithium-nickel-cobalt-aluminum composite oxide in terms of tungsten element.

In Experimental Example 3, it is believed that the precipitation rate of the erbium hydroxide particles in the suspension is low because the pH of the suspension is set to 9, and thus the erbium hydroxide particles are uniformly precipitated on the entire surfaces of the lithium transition metal oxide secondary particles without forming secondary particles.

Experimental Example 4

A battery A4 was produced in the same manner as in Experimental Example 1, except that the powder obtained after the filtration was dried in a vacuum at 200° C. without being sprayed with the tungsten aqueous solution in the production of the positive electrode active material in Experimental Example 3.

Experimental Example 5

A battery A5 was produced in the same manner as in Experimental Example 1, except that the aqueous erbium sulfate solution was not added and thus erbium hydroxide was not caused to adhere to the surfaces of the lithium transition metal oxide secondary particles in the production of the positive electrode active material in Experimental Example 1.

The cross-section of the positive electrode active material was observed with a scanning electron microscope (SEM). It was confirmed that the tungsten compound was present at the interfaces between the primary particles inside the secondary particles. The coating mass of the tungsten compound was measured by inductively coupled plasma (ICP) emission spectrometry. The coating mass was 0.67 mass % relative to the lithium-nickel-cobalt-aluminum composite oxide in terms of tungsten element.

Experimental Example 6

A battery A6 was produced in the same manner as in Experimental Example 1, except that the aqueous erbium sulfate solution was not added and thus erbium hydroxide was not caused to adhere to the surfaces of the lithium transition metal oxide secondary particles, and also the tungsten aqueous solution was not sprayed in the production of the positive electrode active material in Experimental Example 1.

Experiment

[Measurement of DCR]

The DCRs of the produced batteries A1 to A6 before charge-discharge cycles and after 100 cycles were measured under the following conditions.

<Measurement of DCR Before Cycles>

After charge was performed at a current of 475 mA to an SOC of 50%, constant voltage charge was performed at a battery voltage at which the SOC reached 50% until the current reached 30 mA. The OCV was measured 120 minutes after the completion of the charge. Discharge was performed at 475 mA for 10 seconds to measure a voltage after 10 seconds of discharge. The DCR (SOC 50%) before cycles was determined from formula (1) below.

$$DCR(\Omega)=(OCV(V) \text{ after } 120 \text{ minutes of pause–voltage (V) after } 10 \text{ seconds of discharge})/(\text{current (A)}) \quad (1)$$

Subsequently, 100 charge-discharge cycles each including charge and discharge under the following conditions were repeatedly performed. The pause time between the measurement of the DCR before cycles and the charge-discharge cycle test was 10 minutes.

<Charge-Discharge Cycle Test>

Charge Conditions

Constant current charge was performed at a current of 475 mA until the battery voltage reached 4.2 V (the positive electrode potential was 4.3 V with respect to lithium). After the battery voltage reached 4.2 V, constant voltage charge was performed at a constant voltage of 4.2 V until the current reached 30 mA.

Discharge Conditions

Constant current discharge was performed at a constant current of 950 mA until the battery voltage reached 3.0 V.

Pause Conditions

The pause interval between the charge and the discharge was 10 minutes.

<Measurement of DCR after 100 Cycles>

The DCR after 100 cycles was measured by the same method as that for measuring the DCR before cycles. The pause time between the charge-discharge cycle test and the measurement of the DCR after cycles was 10 minutes.

The measurement of DCR and the charge-discharge cycle test were performed in a thermostat at 60° C.
[Calculation of DCR Increase Rate]
The DCR increase rate after 100 cycles was calculated from formula (2) below. Table 1 shows the results. DCR increase rate (SOC 50%)

=(DCR(SOC 50%) after 100 cycles)/(DCR(SOC 50%) before cycles)×100     (2)

TABLE 1

| Battery | Rare-earth element | Adhesion state of rare-earth compound | Presence of tungsten compound | DCR increase rate (%) |
|---|---|---|---|---|
| A1 | Er | aggregated in recess | Yes | 35 |
| A2 | Er | aggregated in recess | No | 41 |
| A3 | Er | uniformly dispersed | Yes | 48 |
| A4 | Er | uniformly dispersed | No | 45 |
| A5 | — | — | Yes | 48 |
| A6 | — | — | No | 44 |

The battery A1 will be considered below. In the positive electrode active material of the battery A1, the rare-earth compound secondary particles 25 adhere to both the lithium transition metal oxide primary particles 20 adjacent to each other in the recesses 23 as illustrated in FIG. 1. This is believed to suppress surface alteration and cracking at the interfaces of the primary particles on both the surfaces of the adjacent lithium transition metal oxide primary particles 20 during high-temperature charge-discharge cycles. Furthermore, it is believed that the rare-earth compound secondary particles 25 also produce an effect of fixing (bonding) the lithium transition metal oxide primary particles 20 adjacent to each other, which suppresses cracking at the interfaces of the primary particles in the recesses 23.

In the battery A1, since the rare-earth compound secondary particles 25 adhere to both the lithium transition metal oxide primary particles 20 adjacent to each other in the recesses 23, the elution of the tungsten-containing compound 27 from the inside of the lithium transition metal oxide secondary particles 21 is suppressed even at high temperatures. In the battery A1, therefore, the tungsten-containing compound 27 adheres to the interfaces of the primary particles inside the lithium transition metal oxide secondary particles 21 even at high temperatures. This is believed to suppress the surface alteration of the primary particles inside the lithium transition metal oxide secondary particles 21 and the cracking at the interfaces of the primary particles.

In the battery A1, as described above, the surface alteration and cracking of the positive electrode active material are suppressed on the surface of and inside the positive electrode active material, and an increase in the resistance of the positive electrode is suppressed. Thus, the DCR increase rate after the high-temperature cycles was believed to be the lowest.

Figure 2:
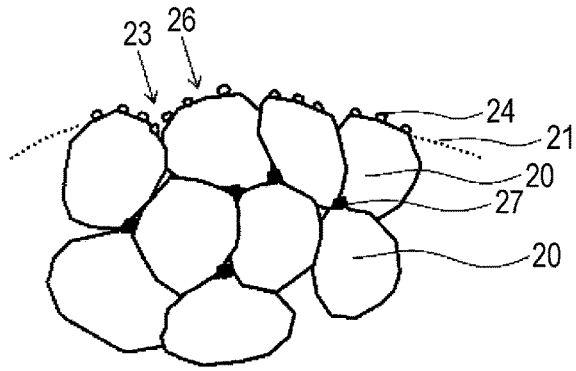
FIG. 2 is a partially enlarged cross-sectional view schematically illustrating a positive electrode active material in Experimental Example 3.
Figure 3:
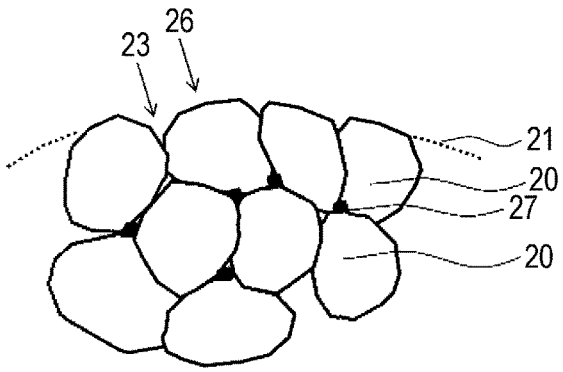
FIG. 3 is a partially enlarged cross-sectional view schematically illustrating a positive electrode active material in Experimental Example 5.

The batteries A3 and A5 will be considered below. In the positive electrode active material used for the battery A3, the rare-earth compound primary particles 24 uniformly adhere to the entire surfaces of the lithium transition metal oxide secondary particles 21 without forming secondary particles as illustrated in FIG. 2. In the positive electrode active material used for the battery A3, the tungsten-containing compound 27 adheres to the interfaces of the primary particles inside the lithium transition metal oxide secondary particles 21. In the positive electrode active material used for the battery A5, as illustrated in FIG. 3, a rare-earth compound does not adhere to the surfaces of the lithium transition metal oxide secondary particles 21, and the tungsten-containing compound 27 adheres to the interfaces of the primary particles inside the lithium transition metal oxide secondary particles 21.

In the batteries A3 and A5, the rare-earth compound secondary particles do not adhere to the recesses 23 on the surfaces of the lithium transition metal oxide secondary particles 21. Therefore, it is believed that the surface alteration of the adjacent lithium transition metal oxide primary particles 20 and the cracking at the interfaces of the primary particles cannot be suppressed. It is also believed in the batteries A3 and A5 that the rare-earth compound secondary particles 25 do not adhere to the recesses 23, and thus the elution of the tungsten-containing compound 27 from the inside of the lithium transition metal oxide secondary particles 21 cannot be suppressed at high temperatures.

The elution of the tungsten-containing compound 27 eliminates an effect of suppressing the alteration at the interfaces of the primary particles inside the lithium transition metal oxide secondary particles 21 and increases the resistance of the positive electrode. Furthermore, a part of the eluted tungsten-containing compound 27 is deposited on the surface of the negative electrode, which increases the resistance of the negative electrode. It is believed that since the elution of the tungsten-containing compound 27 increases the resistances of the positive electrode and the negative electrode, the DCR increase rate after the high-temperature cycles is higher in the batteries A3 and A5 than in the batteries A4 and A6 in which the tungsten-containing compound 27 is not contained.

The batteries A2, A4, and A6 will be considered. The positive electrode active materials for the batteries A2, A4, and A6 respectively correspond to the positive electrode active materials illustrated in FIGS. 1, 2, and 3, except that the tungsten-containing compound 27 does not adhere to the positive electrode active materials.

In the battery A2, the rare-earth compound secondary particles 25 adhere to both the lithium transition metal oxide primary particles 20 adjacent to each other in the recesses 23. Thus, it is believed that the surface alteration and the cracking at the interfaces of the primary particles on both the surfaces of the lithium transition metal oxide primary particles 20 adjacent to each other can be suppressed for the same reason as the battery A1. In the battery A2, however, a tungsten-containing compound does not adhere to the inside of the lithium transition metal oxide secondary particles 21, and thus the surface alteration of the primary particles inside the lithium transition metal oxide secondary particles 21 and the cracking at the interfaces of the primary particles cannot be suppressed. Therefore, it is believed that the resistance of the positive electrode increases and the DCR increase rate after the high-temperature cycles is higher in the battery A2 than in the battery A1.

In the batteries A4 and A6, the rare-earth compound secondary particles do not adhere to the recesses 23 on the surfaces of the lithium transition metal oxide secondary particles 21, and thus the surface alteration of the adjacent lithium transition metal oxide primary particles 20 and the cracking at the interfaces of the primary particles cannot be suppressed. Furthermore, in the batteries A4 and A6, a tungsten-containing compound does not adhere to the inside of the lithium transition metal oxide secondary particles 21, and thus the surface alteration of the primary particles inside the lithium transition metal oxide secondary particles 21 and the cracking at the interfaces of the primary particles cannot be suppressed. Therefore, it is believed that the resistance of the positive electrode increases compared with the battery A2 and the DCR increase rate after the high-temperature cycles is higher in the batteries A4 and A6 than in the battery A2.

Second Experimental Example

Reference Example 1

LiOH and an oxide obtained by oxidizing, at 500° C., a nickel-cobalt-manganese composite hydroxide represented by $Ni_{0.35}Co_{0.35}Mn_{0.30}(OH)_2$ and obtained by coprecipitation were mixed with each other in an Ishikawa grinding mixer so that the molar ratio of Li and all transition metals was 1.05:1. Subsequently, the resulting mixture was heat-treated in the air at 1000° C. for 20 hours and then pulverized to obtain a lithium-nickel-cobalt-manganese composite oxide having an average secondary particle size of about 15 μm and represented by $Li_{1.05}Ni_{0.35}Co_{0.35}Mn_{0.30}O_2$.

A positive electrode active material was produced in the same manner as in Experimental Example 1, except that the lithium-nickel-cobalt-manganese composite oxide represented by $Li_{1.05}Ni_{0.35}Co_{0.35}Mn_{0.30}O_2$ was used instead of the lithium-nickel-cobalt-aluminum composite oxide represented by $Li_{1.05}Ni_{0.94}Co_{0.03}Al_{0.03}O_2$ in Experimental Example 1. Thus, a positive electrode active material in which erbium compound particles adhere to the surfaces of the lithium transition metal oxide secondary particles was produced.

Figure 4:
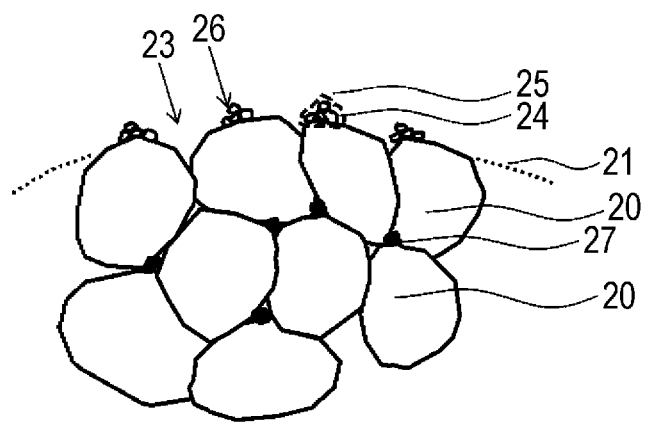
FIG. 4 is a partially enlarged cross-sectional view schematically illustrating a positive electrode active material in Reference Experimental Example 1.

The surface of the positive electrode active material was observed with a SEM. It was confirmed that erbium hydroxide secondary particles having an average particle size of 100 to 200 nm and formed by aggregation of erbium hydroxide primary particles having an average particle size of 20 nm to 30 nm adhered to the surfaces of the lithium transition metal oxide secondary particles. It was also confirmed in the positive electrode active material produced in Reference Example 1 that, as illustrated in FIG. 4, the rare-earth compound secondary particles 25 formed by aggregation of the rare-earth compound primary particles 24 adhered to protruding portions 26 on the surfaces of the lithium transition metal oxide secondary particles and only one of the lithium transition metal oxide primary particles 20 adjacent to each other in the recesses 23 between the lithium transition metal oxide primary particles. The coating mass of the erbium compound was measured by inductively coupled plasma (ICP) emission spectrometry. The coating mass was 0.15 mass % relative to the lithium-nickel-cobalt-aluminum composite oxide in terms of erbium element.

In Reference Example 1, the Ni proportion is as lows as 35%, which decreases the proportion of trivalent nickel. Therefore, it is believed that LiOH generated as a result of a proton exchange reaction hardly appears on the surfaces of the lithium transition metal oxide secondary particles through the interfaces of the lithium transition metal oxide primary particles. In Reference Example 1, the pH of the suspension is as high as 11.5 to 12.0 and secondary particles are easily formed as a result of bonding (aggregation) of erbium hydroxide primary particles precipitated in the suspension. However, it is believed that when the erbium hydroxide secondary particles adhere to the surface of the lithium transition metal oxide, unlike Experimental Example 1, almost all of the erbium hydroxide secondary particles adhere to the protruding portions on the surfaces of the lithium transition metal oxide secondary particles with which they are likely to collide. Some of the erbium hydroxide secondary particles may adhere to the recesses. However, in this case, the erbium hydroxide secondary particles adhere to only one of the lithium transition metal oxide primary particles adjacent to each other in the recesses.

In Experimental Examples above, erbium was used as a rare-earth element, but the cases where samarium and neodymium were used as rare-earth elements were also studied.

Third Experimental Example

Experimental Example 7

A battery A7 was produced in the same manner as in Experimental Example 1, except that a samarium sulfate solution was used instead of the aqueous erbium sulfate solution in the production of the positive electrode active material in Experimental Example 1. The coating mass of the samarium compound was measured by inductively coupled plasma (ICP) emission spectrometry. The coating mass was 0.13 mass % relative to the lithium-nickel-cobalt-aluminum composite oxide in terms of samarium element.

Experimental Example 8

A battery A8 was produced in the same manner as in Experimental Example 1, except that a neodymium sulfate solution was used instead of the aqueous erbium sulfate solution in the production of the positive electrode active material in Experimental Example 1. The coating mass of the neodymium compound was measured by inductively coupled plasma (ICP) emission spectrometry. The coating mass was 0.13 mass % relative to the lithium-nickel-cobalt-aluminum composite oxide in terms of neodymium element.

The DCR increase rates after 100 cycles of the produced batteries A7 and A8 were determined under the same conditions as those in Experimental Example 1.

TABLE 2

| Battery | Rare-earth element | Adhesion state of rare-earth compound | Presence of tungsten compound | DCR increase rate (%) |
|---|---|---|---|---|
| A1 | Er | aggregated in recess | Yes | 35 |
| A7 | Sm | aggregated in recess | Yes | 36 |
| A8 | Nd | aggregated in recess | Yes | 36 |

As is clear from Table 2, when samarium or neodymium, which is the same as erbium in terms of rare-earth element, is used, the DCR increase rate is also suppressed. Therefore, the DCR increase rate is believed to be also suppressed when a rare-earth element other than erbium, samarium, and neodymium is used.

REFERENCE SIGNS LIST 20 lithium transition metal oxide primary particle
21 lithium transition metal oxide secondary particle
23 recess
24 rare-earth compound primary particle
25 rare-earth compound secondary particle
26 protruding portion
27 tungsten-containing compound

The invention claimed is:

1. A positive electrode active material for a nonaqueous electrolyte secondary battery, comprising:
   primary particles formed of a lithium transition metal oxide,
   a secondary particle formed by aggregation of the primary particles,
   the secondary particle having a plurality of recesses, each recess of the plurality of recesses being formed between at least two of the primary particles adjacent to each other on a surface of the secondary particle,
   particles formed of a rare-earth compound,
   rare-earth compound secondary particles formed by aggregation of the particles formed of the rare-earth compound;
   wherein rare-earth compound secondary particles adhere within recesses of the plurality of recesses respectively so as to adhere to the at least two of the primary particles adjacent to each other, and
   a tungsten-containing compound adheres to an interface of the primary particles inside the secondary particle.

2. The positive electrode active material for a nonaqueous electrolyte secondary battery according to claim 1, wherein the rare-earth compound contains a rare-earth element, and the rare-earth element is at least one element selected from the group consisting of neodymium, samarium, and erbium.

3. The positive electrode active material for a nonaqueous electrolyte secondary battery according to claim 1, wherein the rare-earth compound is at least one compound selected from the group consisting of hydroxides and oxyhydroxides.

4. The positive electrode active material for a nonaqueous electrolyte secondary battery according to claim 1, wherein the tungsten-containing compound contains lithium.

5. The positive electrode active material for a nonaqueous electrolyte secondary battery according to claim 1, wherein the lithium transition metal oxide comprises nickel, and a proportion of the nickel in the lithium transition metal oxide is 80% or more based on a total molar quantity of metal elements other than lithium.

6. The positive electrode active material for a nonaqueous electrolyte secondary battery according to claim 1, wherein the lithium transition metal oxide comprises cobalt, and a proportion of the cobalt in the lithium transition metal oxide is 7 mol % or less based on a total molar quantity of metal elements other than lithium.

7. The positive electrode active material for a nonaqueous electrolyte secondary battery according to claim 1,
   wherein the rare-earth compound contains a rare-earth element, and the rare-earth element is at least one element selected from the group consisting of neodymium, samarium, and erbium,
   wherein the tungsten-containing compound contains lithium,
   wherein the lithium transition metal oxide comprises nickel, and a proportion of the nickel in the lithium transition metal oxide is 80% or more based on a total molar quantity of metal elements other than lithium.

8. The positive electrode active material for a nonaqueous electrolyte secondary battery according to claim 1,
   wherein the rare-earth compound contains a rare-earth element, and the rare-earth element is at least one element selected from the group consisting of neodymium, samarium, and erbium,
   wherein the rare-earth compound is at least one compound selected from the group consisting of hydroxides and oxyhydroxides,
   wherein the tungsten-containing compound contains lithium,
   wherein the lithium transition metal oxide comprises nickel, and a proportion of the nickel in the lithium transition metal oxide is 80% or more based on a total molar quantity of metal elements other than lithium.

9. The positive electrode active material for a nonaqueous electrolyte secondary battery according to claim 7, wherein the lithium transition metal oxide comprises cobalt, and a proportion of the cobalt in the lithium transition metal oxide is 7 mol % or less based on a total molar quantity of metal elements other than lithium.

10. The positive electrode active material for a nonaqueous electrolyte secondary battery according to claim 8, wherein the lithium transition metal oxide comprises cobalt, and a proportion of the cobalt in the lithium transition metal oxide is 7 mol % or less based on a total molar quantity of metal elements other than lithium.

* * * * *